(12) United States Patent
Steward et al.

(10) Patent No.: US 9,638,313 B2
(45) Date of Patent: May 2, 2017

(54) BAFFLE FOR AUTOMOTIVE TRANSMISSION

(71) Applicant: FORD GLOBAL TECHNOLOGIES, LLC, Dearborn, MI (US)

(72) Inventors: Mark Steward, Ann Arbor, MI (US); Jayesh Patel, Plymouth, MI (US); Yanhua Li, Novi, MI (US); Matthew S. Eiszler, Pinckney, MI (US); Srinivas Venkata Arcota, Northville, MI (US); David Aeschliman, Whitmore Lake, MI (US); Chintan Ved, Canton, MI (US); William Riley, Warren, MI (US); Jason Bardallis, Waterford, MI (US)

(73) Assignee: FOrd Global Technologies, LLC, Dearborn, MI (US)

( * ) Notice: Subject to any disclaimer, the term of this patent is extended or adjusted under 35 U.S.C. 154(b) by 331 days.

(21) Appl. No.: 14/284,486

(22) Filed: May 22, 2014

(65) Prior Publication Data
US 2015/0337947 A1 Nov. 26, 2015

(51) Int. Cl.
*F16H 57/04* (2010.01)
*F15D 1/00* (2006.01)

(52) U.S. Cl.
CPC ........... *F16H 57/0423* (2013.01); *F15D 1/00* (2013.01); *F15D 1/0005* (2013.01); *F16H 57/04* (2013.01); *F16H 57/0457* (2013.01); *F16H 57/0483* (2013.01); *Y10T 137/86348* (2015.04)

(58) Field of Classification Search
CPC .................................................. F16H 57/0423
See application file for complete search history.

(56) References Cited

U.S. PATENT DOCUMENTS

| | | | |
|---|---|---|---|
| 4,895,268 A | 1/1990 | Hyde | |
| 5,791,262 A | 8/1998 | Knight et al. | |
| 6,886,833 B1 | 5/2005 | von Engelbrechten et al. | |
| 7,712,581 B2 | 5/2010 | Billings et al. | |
| 2006/0065487 A1 | 3/2006 | Tominaga et al. | |
| 2006/0179973 A1 | 8/2006 | Matsufuji et al. | |

*Primary Examiner* — F. Daniel Lopez
(74) *Attorney, Agent, or Firm* — James Dottavio; Brooks Kushman P.C.

(57) ABSTRACT

A transmission in a vehicle includes a gearbox and a differential. Torque is transferred from an output of the gearbox to an input of the differential via a drive member. This transfers torque to enable the differential to distribute the torque amongst wheels of the vehicle. A transmission housing and a torque converter housing are mounted to one another to at least partially house the gearbox and the differential, respectively. A transmission fluid sump is provided between the housings where transmission fluid gathers. A fluid pump pressurizes the fluid and distributes it amongst working parts in the transmission. A baffle assembly partially contains the drive member and segregates the fluid sump from the drive member. One of the baffles in the assembly includes a lip engaging a portion of an outer flange of the pump to provide a seal between the fluid pump and components within the transmission.

18 Claims, 4 Drawing Sheets

BAFFLE FOR AUTOMOTIVE TRANSMISSION

TECHNICAL FIELD

The present disclosure is directed to a transmission and an attached baffle for facilitating fluid flow through the fluid pump and within the transmission.

BACKGROUND

Conventional and hybrid vehicles alike typically require a transmission to provide speed and torque conversions from the engine to another device such as a differential, for example. Lubricating fluid or oil is necessary to reduce adverse side effects of friction and maintain operability of the moving parts within the transmission. The fluid circulates throughout the transmission via a pump and collects in a pan or sump at the bottom of the transmission housing.

In a typical transmission, a drive member such as a chain transfers torque from an output shaft to a differential, where the torque is distributed to the wheels of the vehicle. As the drive member revolves and works to transfer the torque, the drive member may contact the transmission fluid collected in the pan or sump. As the drive member does so, the transmission fluid may be splashed and sprayed throughout the outer regions of the interior of the transmission housing, especially when the drive member revolves at high speeds. Baffles have been implemented in vehicles to reduce the flooding of the drive member with the transmission fluid.

SUMMARY

According to one embodiment, a transmission comprises a torque converter housing, a fluid pump, and a baffle. The torque converter housing has an outer surface. The fluid pump is mounted to the torque converter housing and includes an outer flange. The baffle has a base and a lip extending from the base. The lip engages a portion of the torque converter housing and the outer flange. By doing so, the lip provides a seal between the torque converter housing and the outer flange. This segregates fluid in a fluid sump from a drive member housed in the baffle that is adapted to couple a gearbox sprocket to a differential sprocket.

In another embodiment, a baffle assembly within a vehicle transmission is provided. The baffle assembly includes a first baffle having a base and a lip extending transverse from the base. The lip is adapted to engage a portion of a transmission fluid pump to inhibit fluid flow between the baffle and the torque converter housing. The baffle assembly also includes a second baffle secured to the first baffle and having a base adapted to mount to a transmission housing. The first and second baffles cooperate to segregate a fluid sump from a drive member adapted to couple a gearbox sprocket to a differential sprocket.

In yet another embodiment, a vehicle comprises a torque converter housing, a transmission housing, a fluid pump, and a baffle. The torque converter housing and the transmission housing cooperating to define a sump at a low point where fluid gathers. The fluid pump is mounted between the torque converter housing and the transmission housing and is configured to pressurize and distribute the fluid from the sump amongst parts within and transmission and/or differential. The baffle segregates the fluid sump from a drive member adapted to couple a gearbox sprocket to a differential sprocket. The baffle has a lip inhibiting fluid flow between the baffle and the torque converter housing.

In any of the above embodiments and other embodiments, the lip of the baffle may define a plurality of slits, cuts, or grooves. The lip has an outer edge spaced from the base of the baffle, and the slips, cuts or grooves extend from the outer edge toward the base. The slits, cuts or grooves allow for relative flexibility amongst portions of the lip such that the lip can flex to provide a proper seal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
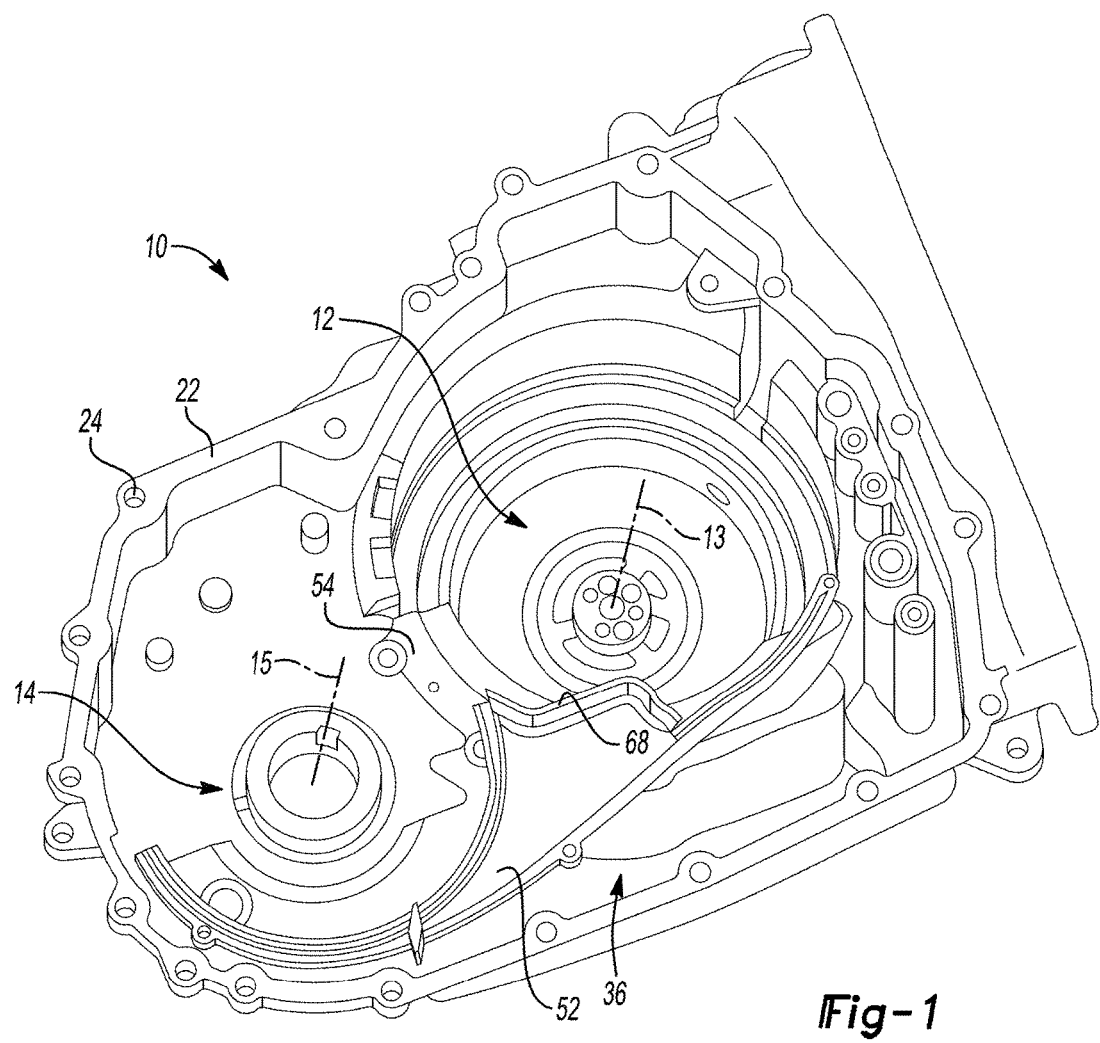
FIG. 1 is a perspective view of a transmission housing having a baffle secured thereto, according to one embodiment.
Figure 2:
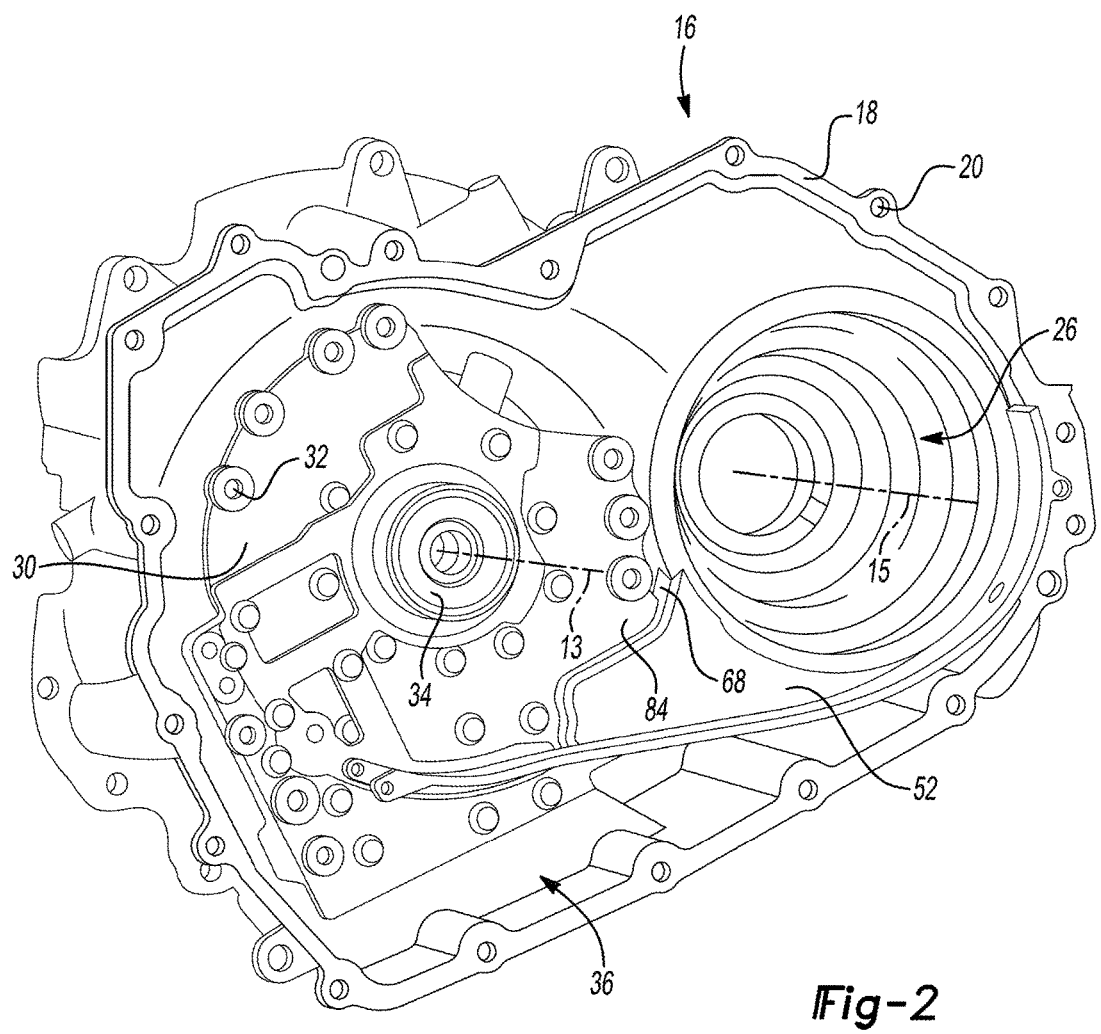
FIG. 2 is a perspective view of a torque converter housing and a fluid pump engaged with the baffle, according to one embodiment.
Figure 3:
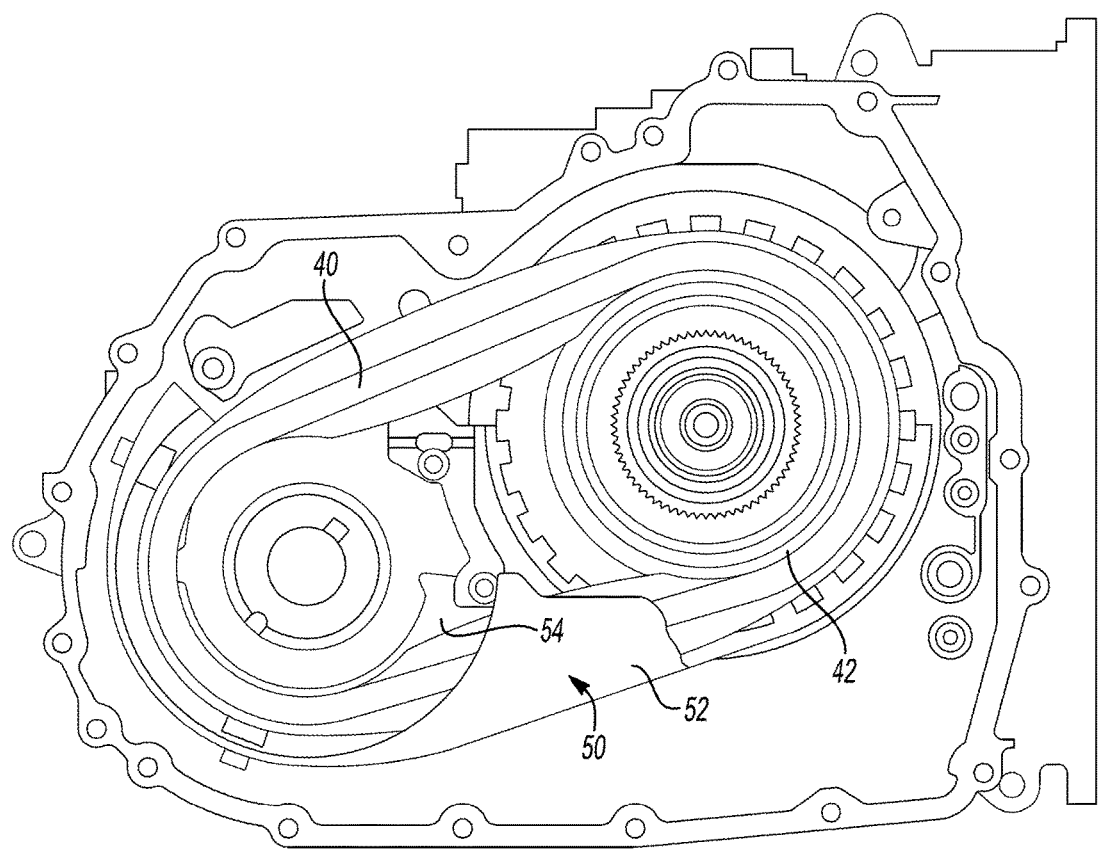
FIG. 3 is a plan view of the transmission housing and baffle of FIG. 1 with a drive member for coupling a transmission to a differential, according to one embodiment.

FIGS. 1-3 described below are directed to a transmission housing and a differential housing that mount to one another within a vehicle. The interior of the housings cooperate to at least partially house a transmission gearbox and a differential that transmit torque form a power source (e.g., internal combustion engine, high voltage battery, fuel cells, etc.) and distribute the force amongst wheels of the vehicle. A drive member transfers the torque from an output of the gearbox to an input of the differential. Lubricating fluid circulates through the gearbox and differential of the transmission and drains into a sump. A baffle assembly segregates the drive member from the sump. While the context of the disclosure below regarding the baffle assembly is particularly focused with application in a vehicle transmission, it should be understood that the features of the baffle assembly may be implemented in any context in a vehicle in which fluid is intended to be sealed and fluid flow is intended to be reduced or inhibited between regions of the vehicle.

FIG. 1 illustrates a transmission housing 10 including a transmission gearbox well 12 for receiving a transmission gearbox (not shown). The gearbox is arranged along a primary axis 13. The gearbox can include one or more planetary gearsets, for example, for establishing a plurality of gear ratios to produce a plurality of forward and reverse drive gears.

Similarly, a differential well 14 is provided for housing at least a portion of a differential (not shown). The differential is arranged along a secondary axis 15 spaced and offset from the primary axis 13. An output of the gearbox along the primary axis 13 is operatively coupled to an input of the differential along the secondary axis 15. The torque output by the transmission drives the coupled differential to distribute the torque to and amongst the wheels. The coupling of these two components is further described with reference to FIG. 3 below.

It should be understood that the differential can be any differential that selectively distributes torque to the wheels, such as a limited slip differential (LSD), or electronic limited slip differential (eLSD). Similarly, while the gearbox is preferably includes a plurality of planetary gearsets, the gearbox can include other known transmission structure such as, for example, a continuously variable transmission (CVT).

FIG. 2 illustrates a torque converter housing 16 that is adapted to mount or otherwise secure to the transmission housing 10. Specifically, the torque converter housing 16 includes a mating surface 18 defining a plurality of apertures 20. The mating surface 18 meets with a mating surface 22 of the transmission housing (FIG. 1). The apertures 20 align with corresponding apertures 24 in the transmission housing to cooperatively receive bolts, screws, or other fasteners to secure the housings 10, 16 together at the mating surfaces 18, 22. A seal may be provided between the mating surfaces 18, 22 when the housings 10, 16 are secured together. The differential well 14 of FIG. 1 aligns with the differential well 26 of FIG. 2 when the housings 10, 16 are assembled to cooperatively receive at least a portion of the differential.

As shown in FIG. 2, a pump 30 is mounted or otherwise secured to the torque converter housing 16 via, for example, a plurality of attachment apertures 32. One or more bearing supports 34 are coaxial with the primary axis 13 and provide a surface for one or more bearings that connects the output of the transmission gearbox to the pump 30. When operated by the transmission output, the pump 30 is configured to pump lubricating fluid (e.g., oil) throughout components within the transmission and differential.

A low point between the connected housings 10, 16 defines a fluid sump 36. The sump 36 can optionally include a pan and serves to collect the lubricating fluid. The pump 30 pressurizes and delivers the fluid from the sump 36 to the moveable components within the transmission.

As previously described, the output of the gearbox is operative coupled to an input of the differential. This is accomplished via a drive member 40, as shown in FIG. 3. The drive member 40 can be a belt or chain that is disposed between the housings 10, 16 and couples the output of the gearbox to the input of the differential. In particular, torque output by the transmission drives a drive sprocket 42 mounted on the primary axis 13. Rotation of the drive sprocket 42 causes the drive member 40 to rotate a driven sprocket (not shown) mounted on the secondary axis 15 which, in turn, transmits the torque to the differential.

As best illustrated in FIG. 3, the drive member 40 is arranged at an offset angular orientation. This causes a portion of the drive member 40, particularly the lowest portion of the drive member 40 near the driven sprocket, to contact lubricating fluid in the sump 36 as the drive member 40 rotates. This can cause splashing or aeration of the lubricating fluid in the sump 36. In particular, when the sump 36 is flooded or includes standing lubricating fluid therein, the fluid is propelled throughout the cavity between the housings 10, 16. This can cause excess circulation of the fluid and exposure of the fluid and the components within the transmission. This can increase the amount of particulates in the fluid that are to be filtered, reducing the longevity of the fluid.

Figure 4:
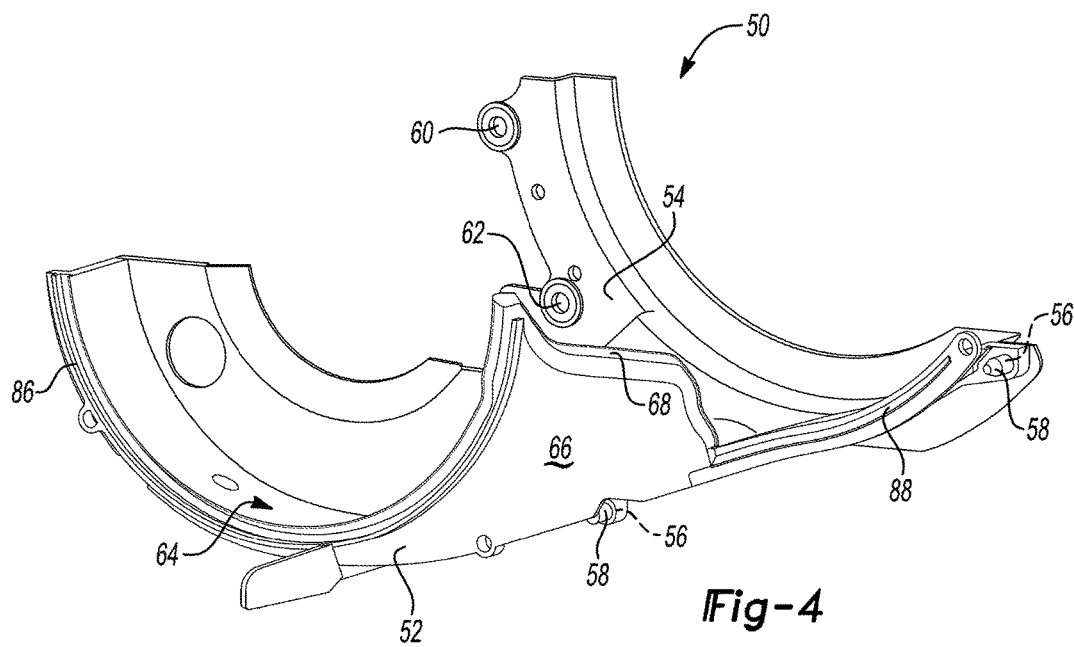
FIG. 4 is perspective view of the baffle and an attached secondary baffle, according to one embodiment.

FIGS. 1-3 illustrate a baffle assembly 50 that reduces the propelling of the fluid and the consequential effects described above. The baffle assembly 50 is illustrated in each of FIGS. 1-4 with FIG. 4 showing the baffle assembly 50 in isolation. The baffle assembly 50 is two-part, including a first baffle 52 and a second baffle 54. Each of the two-parts can be made of a polymeric material, such as HYTREL® 7246 manufactured by DUPONT®. The first baffles 52 is secured to the second baffle 54 via apertures 56 formed in the first baffle 52 for receiving corresponding protrusions 58 formed in the second baffle 54. The second baffle 54 is mounted or otherwise secured to the transmission housing 10 via mounting holes 60, 62.

The baffle assembly 50 defines an interior region 64 between the individual baffles 52, 54. This interior region 64 is designed to accommodate and partially encompass or house the rotating drive member 40 as it rotates. In other words, the drive member 40 rotates between the boundaries created by inward-facing surfaces of the first baffle 52 and the second baffle 54. With this arrangement, the baffle assembly 50 creates a boundary and segregates the drive member 40 from the fluid sump 36.

Figure 5:
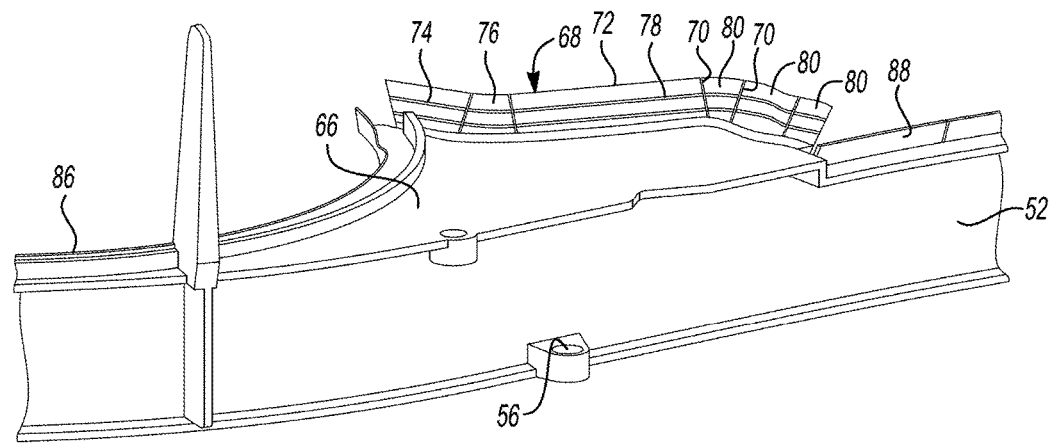
FIG. 5 is a perspective-bottom view of the baffle of FIG. 4.

As best seen in FIG. 5, in which the first baffle 52 is shown in isolation, the first baffle 52 includes a base portion 66 that, when the baffles 52, 54 are assembled, is located in a region between the transmission gearbox and the differential. A lip 68 extends from the base portion 66 in a generally transverse direction (e.g., within a range of 30 degrees from perpendicular) and has a thickness less than a thickness of the base portion 66. The lip 68 defines a plurality of vertical slits 70 that extend from an outer edge 72 of the lip toward or to the base portion 66. The slits may be cuts, slots or pockets that extend either partially or (preferably) entirely through the thickness of the lip 68. The slits 70 separate multiple lip portions 74, 76, 78, 80. For example, a linear lip portion 74 is adjacent to an arcuate lip portion 76, which is adjacent to an elongated linear lip portion 78, which ends adjacent to multiple curved lip portions 80. The slits 70 enable the individual lip portions to flex and bend relative to one another, allowing the entire lip 68 to provide a proper seal against the transmission fluid pump 30, as will be discussed below. Grooves formed the lip 68 can also be provided to allow for relative bending or folding of the individual lip portions. These grooves can be generally perpendicular to the slits 70.

Referring back to FIG. 2, the first baffle 52 is attached to the second baffle 54 via holes 56 that receive protrusions 58. Each baffle defines one half of the two-part assembly that provides a path for the drive member 40. The lip 68 is pressed against a flange 84 of the pump 30 that extends at least partially about a perimeter of the pump 30. This provides a seal or sealing surface between the fluid sump 36 and the rotating components within the baffle assembly 50 (e.g., the drive member 40, the drive sprocket 42 and the driven sprocket). The sealing aids in reducing the fluid aeration during transmission operation which in turn reduces parasitic and frictional losses. This improves the overall transmission efficiency. The slits 70 enable the lip 68 to conform to the shape of the outer face of the pump 36 and its flange 84, providing a proper seal about all turns and edges of a portion of the interface between the pump 36 and housing 16.

Referring back to FIGS. 4 and 5, additional lips are provided to seal with the pump 36 and the housing 16. For example, a first arcuate lip 86 engages the torque converter housing 16 and is shaped similar to the differential wells 14, 26 and the curvature of the driven sprocket. A second arcuate lip 88, at least a portion thereof being arcuate or arch-shaped, is shaped similar to at least a portion of the transmission gearbox well 12 and the curvature of the drive sprocket 42. The second baffle 54 can also be similarly shaped. The curves and shape of the baffle assembly 50 enables the interior region 64 to remain within a close proximity of the drive member 40.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a torque converter housing;
   a fluid pump mounted to the torque converter housing and having an outer flange about a portion of a perimeter of the fluid pump; and
   a baffle having a base and a lip extending generally transverse from the base, the lip contacting a portion of the outer flange to provide a seal between the fluid pump and components within the transmission.

2. The transmission of claim 1, wherein the lip defines a plurality of slits.

3. The transmission of claim 2, wherein the lip has an outer edge spaced from the base of the baffle, the slits extending from the outer edge toward the base.

4. The transmission of claim 1, wherein the base has a thickness that exceeds a thickness of the lip.

5. The transmission of claim 1, wherein the lip has a flexibility that exceeds a flexibility of the base.

6. The transmission of claim 1, wherein the torque converter housing defines a first aperture coaxial with a gearbox output and a second aperture coaxial with a differential input, the baffle further comprising a first arcuate lip at least partially coaxial with the first aperture and a second arcuate lip at least partially coaxial with the second aperture.

7. The transmission of claim 6, wherein the first arcuate lip engages a portion of the fluid pump and the second arcuate lip engages the torque converter housing.

8. The transmission of claim 1, further comprising a transmission housing mounted to the torque converter housing, wherein the transmission housing at least partially houses a gearbox having an output, and wherein the torque converter housing and the transmission housing each define collinear apertures for a differential input.

9. The transmission of claim 8, further comprising a secondary baffle secured to the baffle and to the transmission housing, wherein the baffle and the secondary baffle cooperate to define a path for a drive member that couples the output of the gearbox to the differential input.

10. A baffle assembly within a vehicle transmission comprising:
    a first baffle having
      a base portion spaced from a transmission fluid pump within a torque converter housing, and
      a lip extending transverse from the base portion and adapted to engage a portion of the transmission fluid pump to inhibit fluid flow between the first baffle and the torque converter housing, wherein the lip defines a plurality of slits; and
    a second baffle secured to the first baffle and having a base adapted to mount to a transmission housing;
    wherein the first and second baffles cooperate to segregate a fluid sump from a drive member adapted to couple a gearbox sprocket to a differential sprocket located between the torque converter housing and the transmission housing.

11. The baffle assembly of claim 10, wherein the lip includes an outer edge spaced from the base of the baffle, the slits extending from the outer edge toward the base.

12. The baffle assembly of claim 10, wherein the slits separate portions of the lip and provide relative flexibility amongst the portions.

13. A vehicle comprising:
    a torque converter housing and a transmission housing cooperating to define a fluid sump;
    a fluid pump mounted between the torque converter housing and the transmission housing; and
    a baffle segregating the fluid sump from a drive member adapted to couple a gearbox sprocket to a differential sprocket, the baffle having a lip with a plurality of slits, the lip inhibiting fluid flow between the baffle and the torque converter housing.

14. The vehicle of claim 13, wherein the lip extends generally transverse from a base of the baffle and includes an outer edge spaced from the base, the slits extending from the outer edge toward the base.

15. The vehicle of claim 14, wherein the base has a thickness that exceeds a thickness of the lip.

16. The vehicle of claim 14, wherein the lip has a flexibility that exceeds a flexibility of the base.

17. The vehicle of claim 13, further comprising
    a secondary baffle secured to the baffle and to the transmission housing, and
    wherein the baffle and the secondary baffle cooperate to partially house the drive member.

18. The vehicle of claim 17, wherein the lip provides a seal that at least partially separates fluid in the fluid sump from the drive member.

* * * * *